(12) United States Patent
Hu et al.

(10) Patent No.: US 12,099,251 B2
(45) Date of Patent: Sep. 24, 2024

(54) OPTICAL COMPONENT DRIVING MECHANISM

(71) Applicant: TDK TAIWAN CORP., Taoyuan (TW)

(72) Inventors: Chao-Chang Hu, Taoyuan (TW); Yi-Ho Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 273 days.

(21) Appl. No.: 17/675,404

(22) Filed: Feb. 18, 2022

(65) Prior Publication Data

US 2022/0269147 A1 Aug. 25, 2022

Related U.S. Application Data

(60) Provisional application No. 63/151,204, filed on Feb. 19, 2021.

(51) Int. Cl.
| | |
|---|---|
| *G03B 5/00* | (2021.01) |
| *G02B 7/04* | (2021.01) |
| *G02B 7/09* | (2021.01) |
| *G02B 27/64* | (2006.01) |
| *H04N 23/54* | (2023.01) |
| *H04N 23/55* | (2023.01) |
| *H04N 23/68* | (2023.01) |

(52) U.S. Cl.
CPC .............. *G02B 7/09* (2013.01); *G02B 7/04* (2013.01); *G02B 27/646* (2013.01); *G03B 5/00* (2013.01); *H04N 23/54* (2023.01); *H04N 23/55* (2023.01); *H04N 23/687* (2023.01); *G03B 2205/0069* (2013.01)

(58) Field of Classification Search
USPC .......................................................... 396/55
See application file for complete search history.

(56) References Cited

U.S. PATENT DOCUMENTS

| | | | | |
|---|---|---|---|---|
| 2015/0146025 A1* | 5/2015 | Bang | ........................ | G02B 7/08 |
| | | | | 348/208.99 |
| 2015/0346587 A1* | 12/2015 | Lim | ....................... | G03B 17/02 |
| | | | | 348/373 |
| 2020/0393637 A1* | 12/2020 | Ryoo | ....................... | G02B 7/04 |
| 2021/0302690 A1* | 9/2021 | Lin | .......................... | G02B 7/09 |
| 2022/0082789 A1* | 3/2022 | Hu | ............................ | G03B 5/00 |
| 2022/0244483 A1* | 8/2022 | Hu | .......................... | G02B 7/021 |
| 2022/0244785 A1* | 8/2022 | Hu | ........................... | G06F 3/016 |

* cited by examiner

*Primary Examiner* — Clayton E. LaBalle
*Assistant Examiner* — Warren K Fenwick
(74) *Attorney, Agent, or Firm* — MUNCY, GEISSLER, OLDS & LOWE, P.C.

(57) ABSTRACT

An optical component driving mechanism is provided. The optical component driving mechanism includes a first movable portion, a fixed portion, a first driving assembly, and a first support assembly. The first movable portion is configured to connect the first optical component. The first movable portion is movable relative to the fixed portion. The first driving assembly is configured to drive the first movable portion to move relative to the fixed portion. The first movable portion is movable relative to the fixed portion via the first support assembly. The first movable portion is movable relative to the fixed portion in a first dimension within a first-limit range.

20 Claims, 14 Drawing Sheets

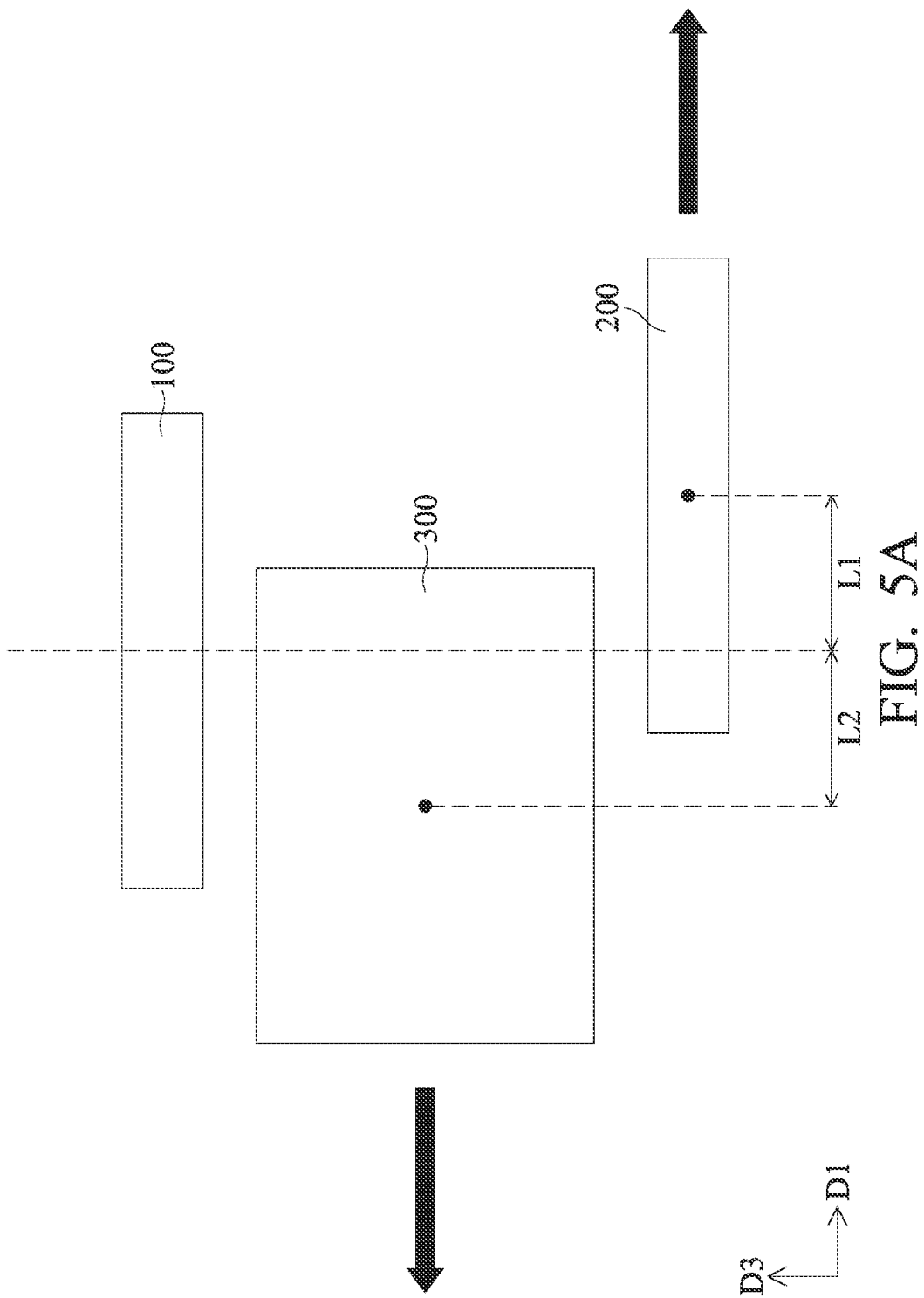

OPTICAL COMPONENT DRIVING MECHANISM

CROSS REFERENCE TO RELATED APPLICATIONS

This application claims the benefit of U.S. Provisional Application No. 63/151,204 filed 19 Feb. 2021, the entirety of which is incorporated by reference herein.

BACKGROUND OF THE INVENTION

Field of the Invention

The present disclosure relates to an optical component driving mechanism, and more particularly to an optical component driving mechanism having driving assemblies, and which thereby is able to perform such functions as optical focusing and optical shake compensation.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the lens module in the electronic device while using it. To improve image quality, it is increasingly important to design an effectively shockproof lens module. In addition, designers are currently pursuing the miniaturization of such devices, and it is expected that electronic products will be smaller and lighter with each successive generation. Therefore, how to design an optical mechanism with a better optical compensation function with a smaller volume through a special configuration is an important issue.

BRIEF SUMMARY OF THE INVENTION

An optical component driving mechanism is provided. The optical component driving mechanism includes a first movable portion, a fixed portion, a first driving assembly, and a first support assembly. The first movable portion is connected to a first optical component. The first movable portion is movable relative to the fixed portion. The first driving assembly is configured to drive the first movable portion to move relative to the fixed portion. The first movable portion is movable relative to the fixed portion via the first support assembly. The first movable portion is movable relative to the fixed portion in a first dimension within a first-limit range.

According to some embodiments of the present disclosure, the optical component driving mechanism further includes a first-limit component, a first sensing assembly, and a first control assembly. The first-limit component limits the range of motion of the first movable portion so as not to exceed the first-limit range. The first sensing assembly senses the movement of the first movable portion. The first control assembly outputs a first driving signal to the first driving assembly. The first sensing assembly outputs a first sensing signal. An external apparatus measures and records a first preset information. The first preset information includes the first sensing signal corresponding to the position of the first movable portion within a first recording range. The first recording range is greater than the first-limit range. The first control assembly outputs the first driving signal according to the first sensing signal and the first preset information.

According to some embodiments of the present disclosure, the optical component driving mechanism further includes a second movable portion, a second driving assembly, and a second driving assembly. The second movable portion is connected to a second optical component. The second movable portion is movable relative to the first movable portion. The second driving assembly is configured to drive the second movable portion to move relative to the fixed portion. The second movable portion is movable relative to the fixed portion in a second dimension within a second-limit range. The first sensing assembly senses the movement of the first movable portion relative to the second movable portion.

According to some embodiments of the present disclosure, the first sensing component includes a reference component or a first sensing component. The reference component or the first sensing component is fixedly disposed on the second movable portion.

According to some embodiments of the present disclosure, the optical component driving mechanism further includes a second support assembly. The second movable portion is movable relative to the fixed portion via the second support assembly. The length of the first support assembly is different from the length of the second support assembly.

According to some embodiments of the present disclosure, The optical component driving mechanism further includes a second-limit component, a second sensing assembly, and a second control assembly. The second-limit component limits the range of motion of the second movable portion so as not to exceed the second-limit range. The second sensing assembly senses the movement of the second movable portion. The second control assembly outputs a second driving signal to the second driving assembly. The second sensing assembly outputs a second sensing signal. The external apparatus measures and records a second preset information. The second preset information includes the second sensing signal corresponding to the position of the second movable portion within a second recording range. The second recording range is smaller than or equal to the second-limit range. The second control assembly outputs the second driving signal according to the second sensing signal and the second preset information.

According to some embodiments of the present disclosure, the first dimension is movement on a first axis. The second dimension is movement on the first axis. The first-limit range is different from the second-limit range. The first sensing assembly and the second sensing assembly are located on different sides with respect to the second movable portion.

According to some embodiments of the present disclosure, the first sensing assembly and the second sensing assembly are located on opposite sides with respect to the second movable portion when viewed along any direction perpendicular to a first optical axis.

According to some embodiments of the present disclosure, after receiving a first instruction signal output by a processing unit, the first control assembly outputs the first driving signal. After receiving a second instruction signal output by the processing unit, the second control assembly outputs the second driving signal. The processing unit is located outside the optical component driving mechanism.

According to some embodiments of the present disclosure, the first control assembly and the second control assembly simultaneously output the first driving signal and the second driving signal to the first driving assembly and the second driving assembly, respectively.

According to some embodiments of the present disclosure, the optical component driving mechanism further includes a third driving assembly and a third movable portion. The third driving assembly is configured to drive the third movable portion to move relative to the fixed portion in a third dimension. The third dimension is movement in the direction of a second optical axis.

According to some embodiments of the present disclosure, the first driving assembly includes a first magnetic component and a first coil. The first coil corresponds to the first magnetic component.

According to some embodiments of the present disclosure, the second driving assembly includes a second magnetic component and a second coil. The second coil corresponds to the second magnetic component.

According to some embodiments of the present disclosure, the first coil and the second coil at least partially overlap when viewed along a first optical axis.

According to some embodiments of the present disclosure, the third driving assembly includes a third magnetic component and a third coil. The third coil corresponds to the third magnetic component.

According to some embodiments of the present disclosure, The optical component driving mechanism further includes a magnetically permeable component and a first circuit assembly. The magnetically permeable component has a magnetically permeable material. The magnetically permeable component is embedded in the first circuit assembly.

According to some embodiments of the present disclosure, the magnetically permeable component overlaps the first coil when viewed along the first optical axis.

According to some embodiments of the present disclosure, the fixed portion includes a frame. The frame accommodates the first movable portion and the second movable portion, The first movable portion at least partially overlaps the frame when viewed along the first optical axis.

According to some embodiments of the present disclosure, the optical component driving mechanism further includes a plurality of buffer components. The buffer components are disposed between the first movable portion and the frame, on the second coil, and on the third coil.

According to some embodiments of the present disclosure, the optical component driving mechanism further includes a second circuit assembly. The second coil is fixedly disposed on the second circuit assembly. The fixed portion further includes a housing. The housing fixedly connected to the frame. The second circuit assembly is disposed between the housing and the frame when viewed along a direction perpendicular to the first optical axis.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 5A is a schematic view of the fixed portion, the first movable portion, and the second movable portion in FIG. 4 moving to a limit position.

DETAILED DESCRIPTION OF THE INVENTION

In order to make the purpose, features, and advantages of the present disclosure more obvious and understandable, the following embodiments are specially cited, and the accompanying drawings are used for detailed description. Among them, the configuration of each element in the embodiment is for illustrative purposes, and is not intended to limit the disclosure. In addition, part of the repetition of the reference numbers in the embodiments is for simplifying the description, and does not mean the relevance between different embodiments. The directional terms mentioned in the following embodiments, for example: up, down, left, right, front or back, etc., are only directions for referring to the attached drawings. Therefore, the directional terms used are used to illustrate and not to limit the disclosure.

In addition, relative terms such as "lower" or "bottom" and "higher" or "top" may be used in the embodiments to describe the relative relationship between one element of the illustration and another element. It can be understood that if the illustrated device is turned upside down, the elements described on the "lower" side will become the elements on the "higher" side.

The optical component driving mechanism of the embodiment of the present invention is described below. However, it can be easily understood that the embodiments of the present invention provide many suitable inventive concepts and can be implemented in a wide variety of specific backgrounds. The specific embodiments disclosed are only used to illustrate the use of the present invention in a specific method, and are not used to limit the scope of the present invention. Unless otherwise defined, all terms used here (including technical and scientific terms) have the same meanings commonly understood by the general artisans to whom the disclosures in this article belong. It is understandable that these terms, such as the terms defined in commonly used dictionaries should be interpreted as having a meaning consistent with the relevant technology and the background or context of this disclosure, and should not be interpreted in an idealized or excessively formal way, unless specifically defined herein.

Figure 1:
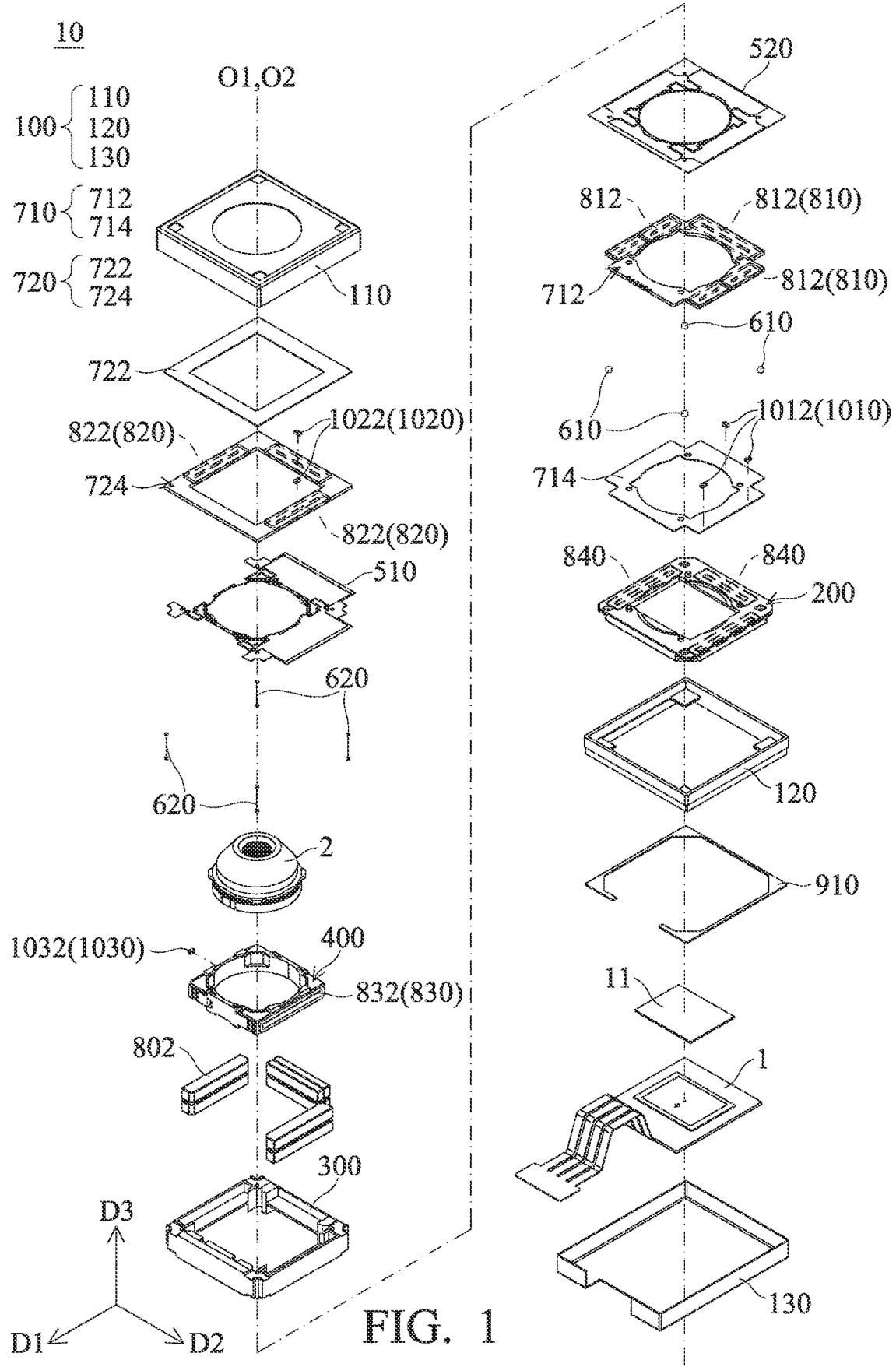
FIG. 1 is an exploded view of an optical component driving mechanism, according to certain aspects of the present disclosure.

FIG. 1 shows an exploded view of an optical component driving mechanism 10, according to certain aspects of the present disclosure. The aforementioned optical component driving mechanism 10 may be disposed inside an electronic device such as a camera, a tablet computer, or a mobile phone, to obtain images. The aforementioned optical component driving mechanism 10 may relatively move both the first optical component 1 and the second optical component 2 disposed therein, so as to achieve the purpose of auto-focusing (AF) and optical image stabilization (OIS).

The first optical component 1 and the second optical component 2 may be optical components such as a photo-sensitive component, a camera lens, a lens, etc. In the present embodiment, the first optical component 1 may be a photosensitive component, and may include a filter 11, and the second optical component 2 may be a lens, but the present disclosure is not limited to this combination. The first optical component 1 has a first optical axis O1, and the second optical component 2 has a second optical axis O2. The detailed structure of the optical component driving mechanism 10 is described below.

Figure 3:
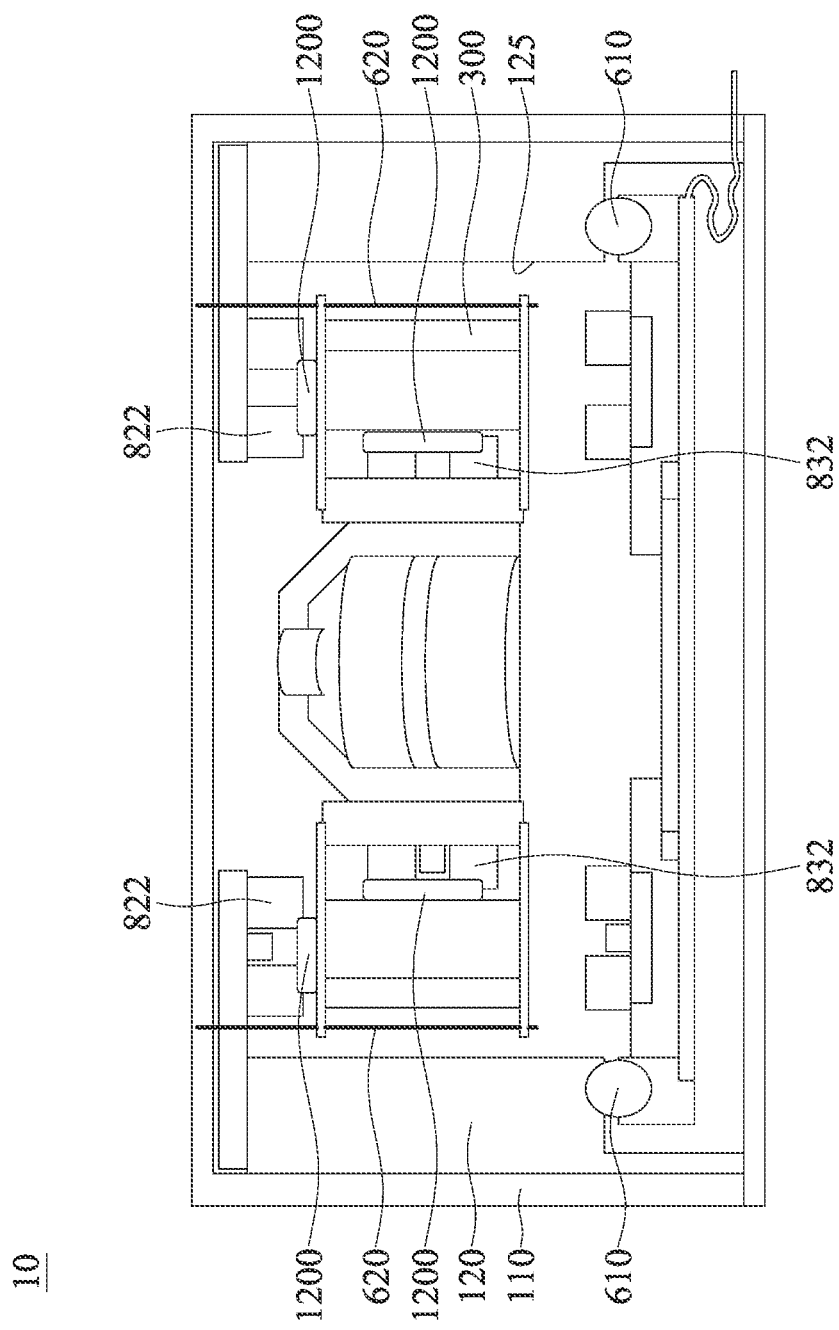
FIG. 3 is a schematic cross-sectional view of the optical component driving mechanism, according to certain aspects of the present disclosure.

As shown in FIG. 1, the optical component driving mechanism 10 includes a fixed portion 100, a first movable portion 200, a second movable portion 300, a third movable portion 400, a first elastic component 510, a second elastic component 520, a first support assembly 610, a second support assembly 620, a first circuit assembly 710, a second circuit assembly 720, a first driving assembly 810, a second driving assembly 820, a third driving assembly 830, three magnetically permeable components 840, a first-limit component 910, a first sensing assembly 1010, a second sensing assembly 1020, a first control assembly 1110 (FIG. 6A), a second control assembly 1120 (FIG. 6B), and a plurality of buffer components 1200 (FIG. 3).

The fixed portion 100 includes a housing 110, a frame 120, and a base 130. The housing 110 is fixedly connected to the frame 120. The frame 120 is fixedly connected to the base 130.

The first movable portion 200 is a holder for connecting the first optical component 1. The third movable portion 400 is a holder for connecting the second optical component 2. The third movable portion 400 is movably connected to the second movable portion 300 via the first elastic component 510 and the second elastic component 520.

The first movable portion 200 is movable relative to the fixed portion 100 in a first dimension within a first-limit range. The second movable portion 300 is movable relative to the fixed portion 100 in a second dimension within a second-limit range. The first-limit range is different from the second-limit range. The third movable portion 400 is movable relative to the fixed portion 100 in a third dimension.

The first dimension and the second dimension are the movement in a plane formed by a first axis D1 and a second axis D2. The first axis D1, the second axis D2, and a third axis D3 are perpendicular to each other. The third axis D3 is substantially parallel to the first optical axis O1 and the second optical axis O2.

The first movable portion 200 is movable relative to the fixed portion 100 via the first support assembly 610. In the present embodiment, the first support assembly 610 has four balls, which are each disposed at four corners of the first movable portion 200. Two ends of the first support assembly 610 contact the frame 120 and the first movable portion 200 respectively.

The second movable portion 300 is movable relative to the fixed portion 100 via the second support assembly 620. In the present embodiment, the second support assembly 620 has four suspension wires, which are each disposed at four corners of the second movable portion 300. Two ends of the second support assembly 620 contact the fixed portion 100 and the second elastic component 520 respectively.

The first circuit assembly 710 includes an upper portion 712 and a lower portion 714. The first circuit assembly 710 is fixedly connected to the first movable portion 200 and is movable relative to the fixed portion 100 together with the first movable portion 200. The second circuit assembly 720 also includes an upper portion 722 and a lower portion 724. The second circuit assembly 720 is fixedly connected to the fixed portion 100 and is disposed between the housing 110 and the frame 120.

The first driving assembly 810 is configured to drive the first movable portion 200 to move in the plane formed by the first axis D1 and the second axis D2 or to rotate relative to the fixed portion 100 around the third axis D3, so as to achieve the function of optical image stabilization. The second driving assembly 820 is configured to drive the second movable portion 300 together with the third movable portion 400 and the second optical component 2 to move in the plane formed by the first axis D1 and the second axis D2, so as to achieve the function of optical image stabilization. The third driving assembly 830 is configured to drive the third movable portion 400 to move in the direction of the second optical axis O2 to achieve the function of auto-focusing.

Figure 2:
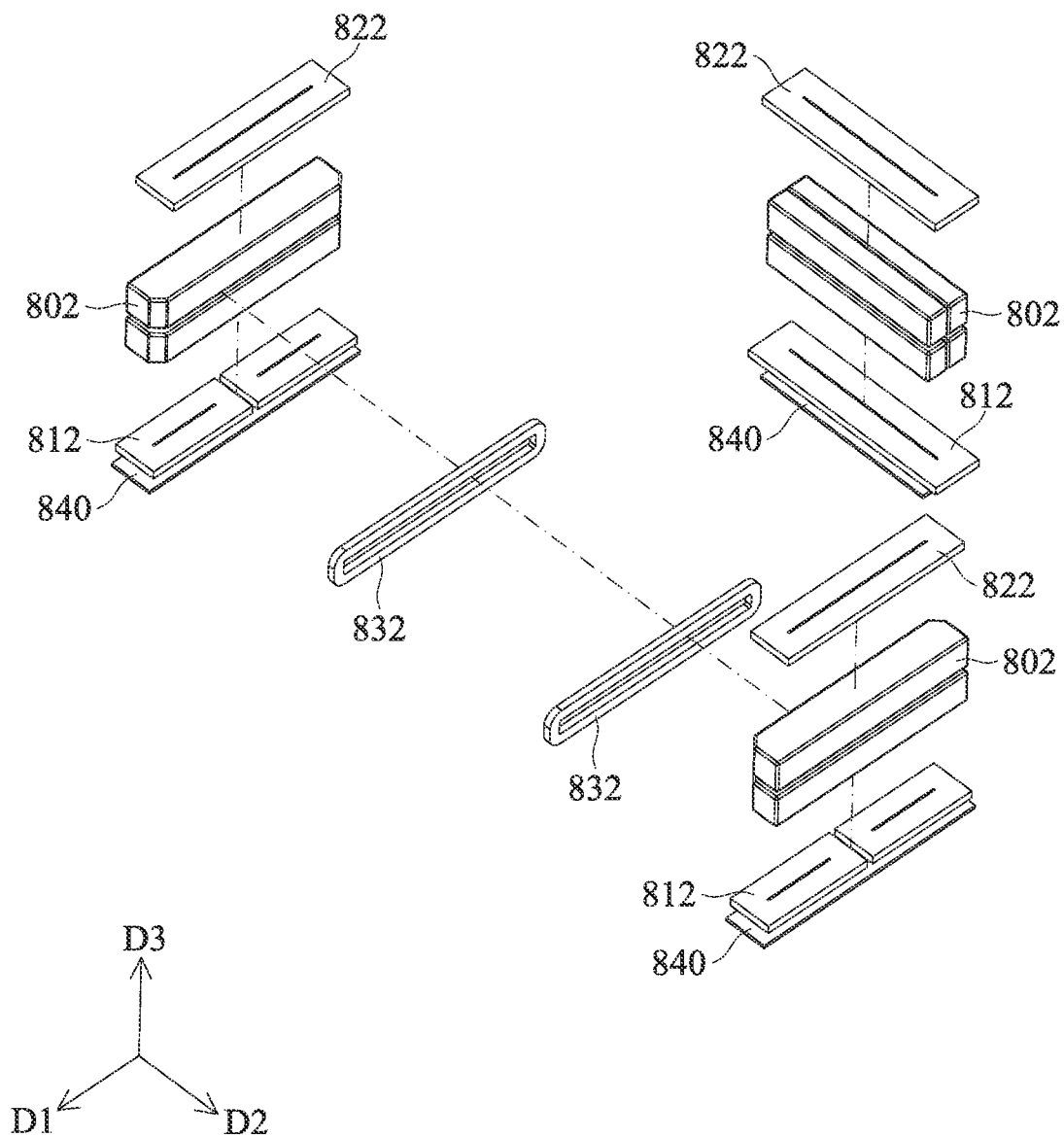
FIG. 2 is an exploded view of the first driving assembly, the second driving assembly, the third driving assembly, and the magnetically permeable components, according to certain aspects of the present disclosure.

Please refer to FIG. 1 to FIG. 2 together, the first driving assembly 810 includes five first coils 812. The second driving assembly 820 includes three second coils 822. The third driving assembly 830 includes two third coils 832. It should be noted that, in the present embodiment, the first coil 812, the second coil 822, and the third coil 832 correspond to the same set of magnetic components 802. That is, the magnetic components 802 are served as the first magnetic component of the first driving assembly 810, the second magnetic component of the second driving assembly 820, and the third magnetic component of the third driving assembly 830 in the present embodiment. In this way, the volume of the optical component driving mechanism 10 may be reduced to achieve miniaturization.

The magnetic components 802 are disposed on the second movable portion 300. The first coils 812 are embedded in the upper portion 712 of the first circuit assembly 710. The second coils 822 are embedded in the lower portion 724 of the second circuit assembly 720. The third coils 832 are disposed on two opposite sides of the third movable portion 400. The first coils 812 and the second coils 822 at least partially overlap when viewed along the first optical axis O1.

The magnetically permeable components 840 are embedded in the first movable portion 200. The magnetically permeable components 840 are made of magnetically permeable material. The magnetically permeable components 840 overlap the first coils 814 when viewed along the first optical axis O1.

Referring back to FIG. 1, the first-limit component 910 is fixed to the frame 120. The first-limit component 910 is configured to limit the range of motion of the first movable portion 200 not to exceed the first-limit range.

The first sensing assembly 1010 includes three first sensing components 1012. The second sensing assembly 1020 includes two second sensing components 1022. The third sensing component 1030 includes a third sensing component 1032. The first sensing assembly 1010, the second sensing assembly 1020, and the third sensing assembly 1030 may use, for example, a Hall Effect Sensor, a Magnetoresistive Sensor (MRS), or optical sensor and the like for sensing.

It should be noted that, in the present embodiment, the magnetic components 802 also serve as a reference component for the first sensing component 1012, the second sensing component 1022, and the third sensing component 1032. In this way, the volume of the optical component driving mechanism 10 may be reduced, and therefore be miniaturized.

The first sensing assembly 1010 is configured to sense the movement of the first movable portion 200 relative to the second movable portion 300. In the present embodiment, the first sensing component 1012 is disposed on the lower portion 714 of the first circuit assembly 710.

The second sensing assembly 1020 is configured to sense the movement of the second movable portion 300. The second sensing component 1022 is disposed on the lower portion 724 of the second circuit assembly 720. When viewed along the direction perpendicular to the third axis D3, the first sensing component 1012 of the first sensing assembly 1010 and the second sensing component 1022 of the second sensing assembly 1020 are located on two opposite sides with respect to the second movable portion 300.

FIG. 3 is a schematic cross-sectional view of an optical component driving mechanism 10 according to certain aspects of the present disclosure. It should be understood that the schematic diagrams may not be drawn to the actual scale of the objects for illustrative purposes, and those of ordinary skill in the art will readily understand that certain elements in the schematic diagrams are simplified or omitted for illustrative purposes.

The buffer component 1200 may prevent the components in the optical component driving mechanism 10 from being damaged due to impact. In the present embodiment, the buffer components 1200 are disposed on the second coil 822 and the third coil 832. The inner side of the frame 120 may serve as the second-limit component 125. The second-limit component 125 is configured to limit the range of motion of the second movable portion 300 not to exceed the second-limit range. The frame 120 accommodates the first movable portion 200 and the second movable portion 300. When viewed along the first optical axis O1, the first movable portion 200 at least partially overlaps the frame 120.

Figure 4:
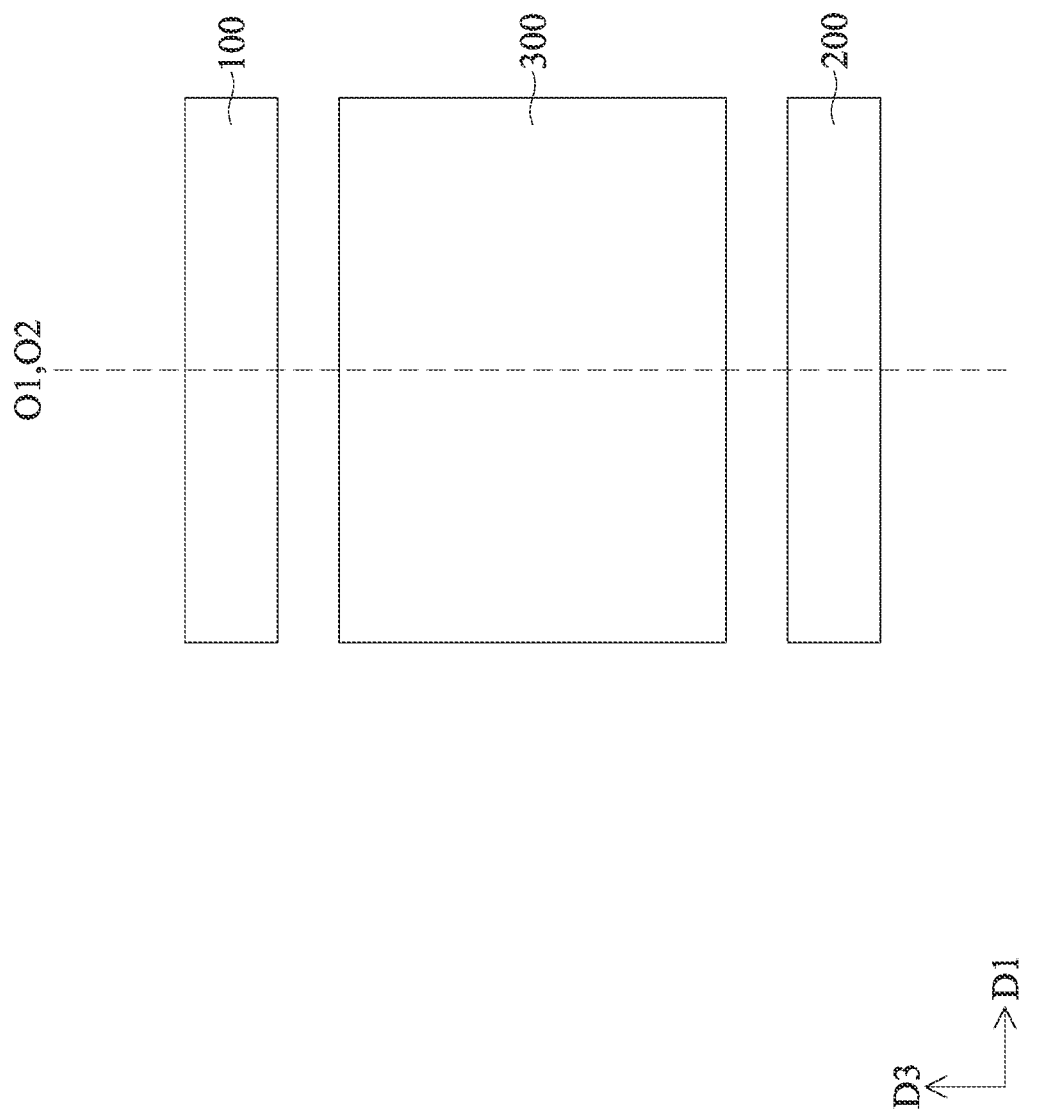
FIG. 4 is a schematic diagram of the fixed portion, the first movable portion, and the second movable portion shown in FIG. 3 in an initial position.

FIG. 4 is a schematic diagram of the fixed portion 100, the first movable portion 200, and the second movable portion 300 shown in FIG. 3 in an initial position. When the first movable portion 200 and the second movable portion 300 are in the initial position, the first optical axis O1 and the second optical axis O2 are substantially coincident.

FIG. 5A is a schematic diagram of the fixed portion 100, the first movable portion 200, and the second movable portion 300 in FIG. 4 moving to a limit position. It should be understood that, with the driving of the first driving assembly 810 and the second driving assembly 820, the first movable portion 200 is movable within the first-limit range, the second movable portion 300 is movable within the second-limit range. Therefore, the first movable portion 200 and the second movable portion 300 do not only have one single limit position, but one of the limit positions is used as an example here.

In the embodiment shown in FIG. 5A, the first movable portion 200 moves a distance L1 in the direction of the positive first axis D1, and the second movable portion 300 moves a distance L2 in the direction of the negative first axis D1. This manner of driving, with the two movable portions moving in opposite directions, enables the optical component driving mechanism 10 to reach a larger optical image stabilization angle or a wider range of focusing with a smaller size.

Figure 5B:
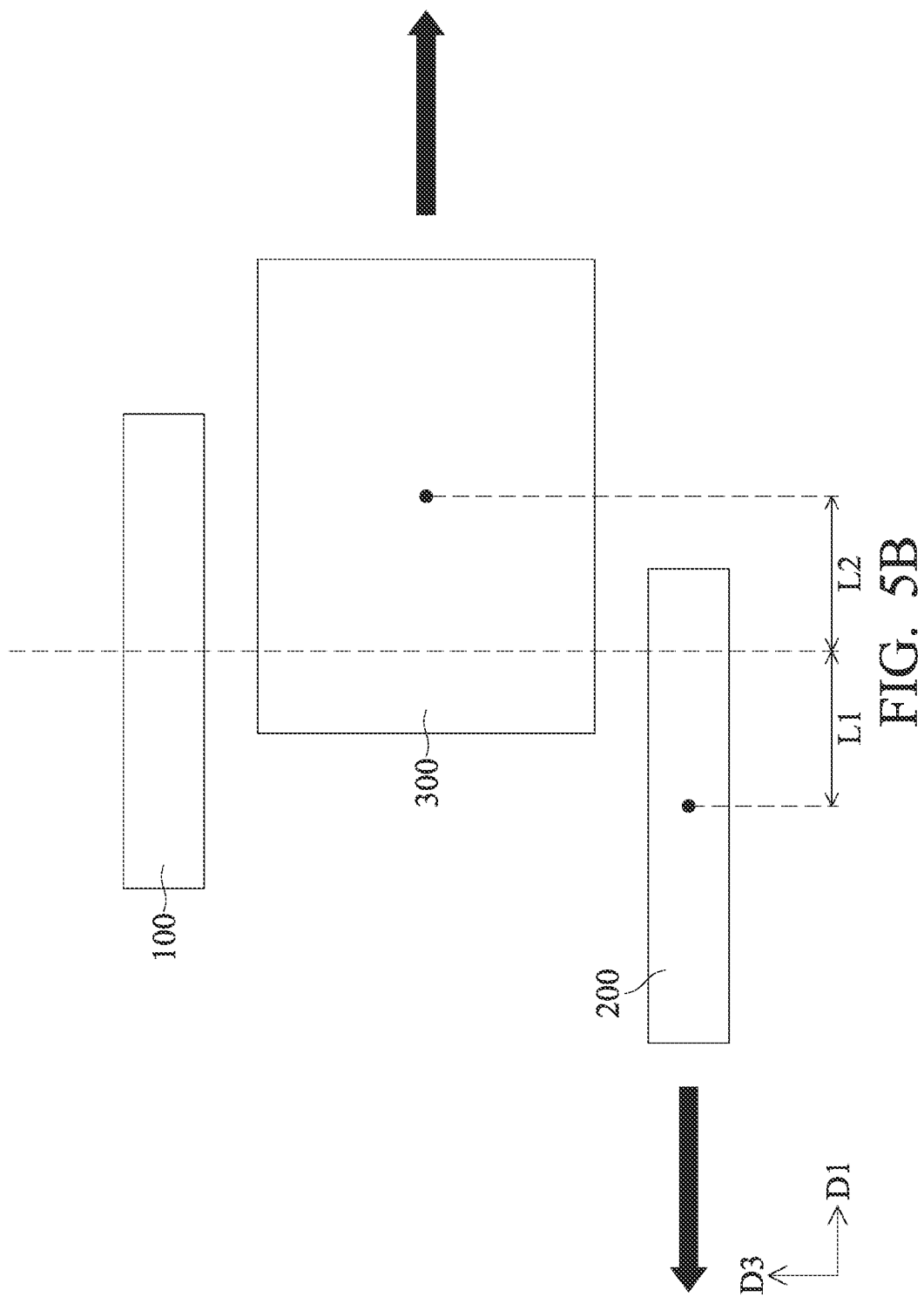
FIG. 5B is a schematic view of the fixed portion, the first movable portion, and the second movable portion in FIG. 4 moving to another limit position.

FIG. 5B is a schematic diagram of the fixed portion 100, the first movable portion 200, and the second movable portion 300 in FIG. 4 moving to another limit position. In the embodiment shown in FIG. 5B, the first movable portion 200 moves a distance L1 in the direction of the negative first axis D1, and the second movable portion 300 moves a distance L2 in the direction of the positive first axis D1. This manner of driving, with the two movable portions moving in opposite directions, enables the optical component driving mechanism 10 to reach a larger optical image stabilization angle or a wider range of focusing with a smaller size.

Figure 6A:
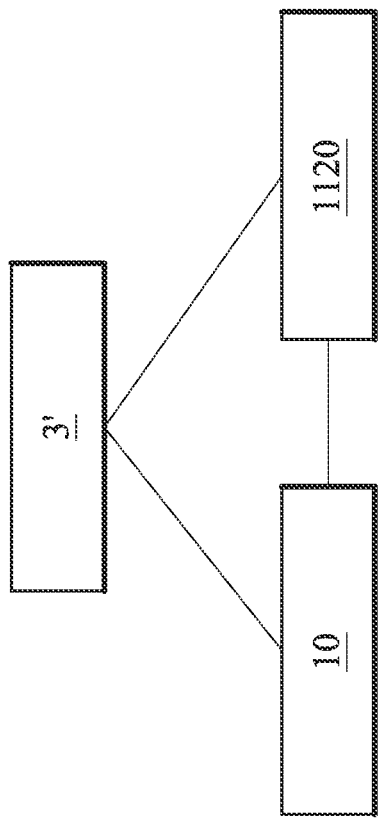
FIG. 6A is a block diagram of a first control assembly and an external apparatus disposed outside the optical component driving mechanism, according to certain aspects of the present disclosure.
Figure 6B:
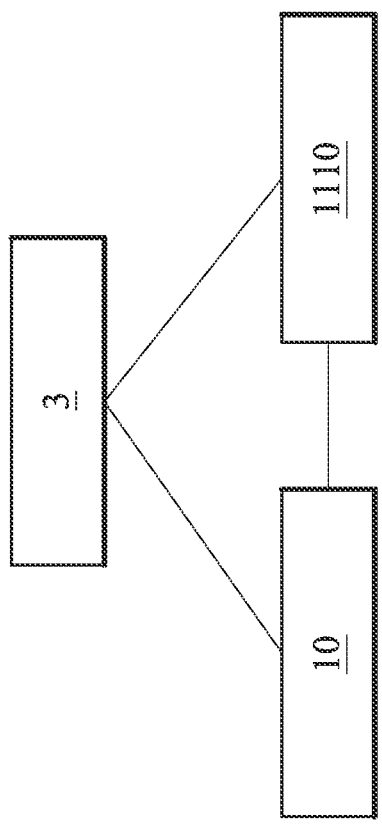
FIG. 6B is a block diagram of a second control assembly and an external apparatus disposed outside the optical component driving mechanism, according to certain aspects of the present disclosure.

FIG. 6A shows a block diagram of the first control assembly 1110 and an external apparatus 3 disposed outside the optical component driving mechanism 10. FIG. 6B shows a block diagram of the second control assembly 1120 and the external apparatus 3' disposed outside the optical component driving mechanism 10. The first control assembly 1110 is configured to output a first driving signal to the first driving assembly 810. The second control assembly 1120 is configured to output a second driving signal to the second driving assembly 820. The external apparatus 3 shown in FIG. 6A and the external apparatus 3' shown in FIG. 6B may be different external apparatuses.

When the optical component driving mechanism 10 is implementing optical image stabilization, the first control assembly 1110 and the second control assembly 1120 simultaneously output the first driving signal and the second driving signal to the first driving assembly 810 and the second driving component 820 respectively, to perform the optical image stabilization function as described in FIGS. 5A-5B.

Figure 6C:
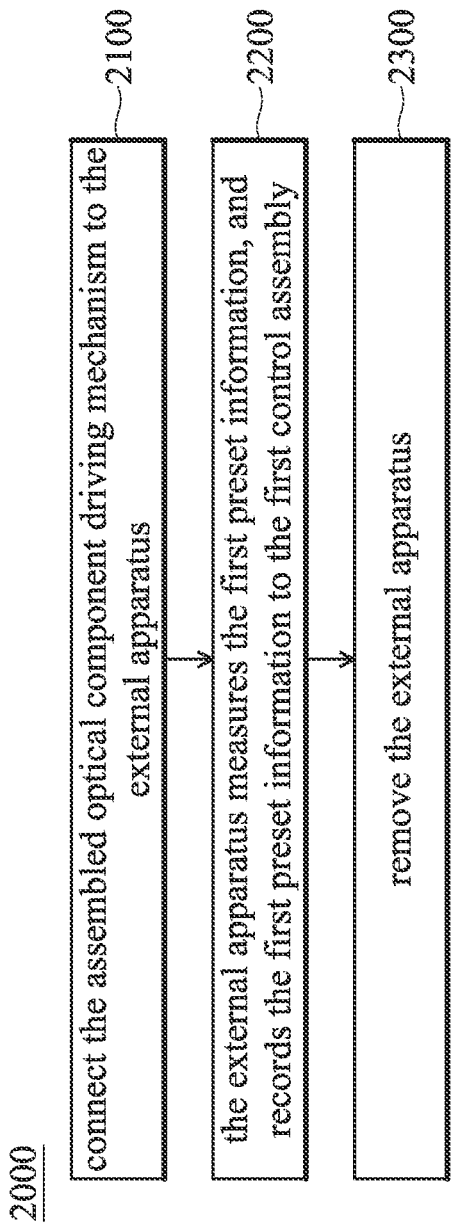
FIG. 6C is a flowchart of measuring a first preset information by the external apparatus, according to certain aspects of the present disclosure.

FIG. 6C shows a flowchart 2000 of the external apparatus 3 measuring a first preset information. The first preset information includes different positions of components corresponding to different magnetic field magnitudes within a first recording range, the first recording range is greater than the first-limit range. Step 2100 includes connecting the assembled optical component driving mechanism 10 to the external apparatus 3. Step 2200 includes the external apparatus 3 measuring the first preset information, and recording the first preset information to the first control assembly 1110. Step 2300 includes removing the external apparatus 3 from the optical component driving mechanism 10.

A second preset information is also recorded to the second control assembly 1120 in a manner similar to the flowchart shown in FIG. 6C. The second preset information includes different positions of components corresponding to different magnetic field magnitudes within a second recording range, the second recording range is smaller than or equal to the second-limit range. In detail, the assembled optical component driving mechanism 10 is connected to the external apparatus 3'. Next, the external apparatus 3' measures the second preset information, and records the second preset information to the second control assembly 1120. Then, the external apparatus 3' is removed from the optical component driving mechanism 10.

Figures 7A, 7B:
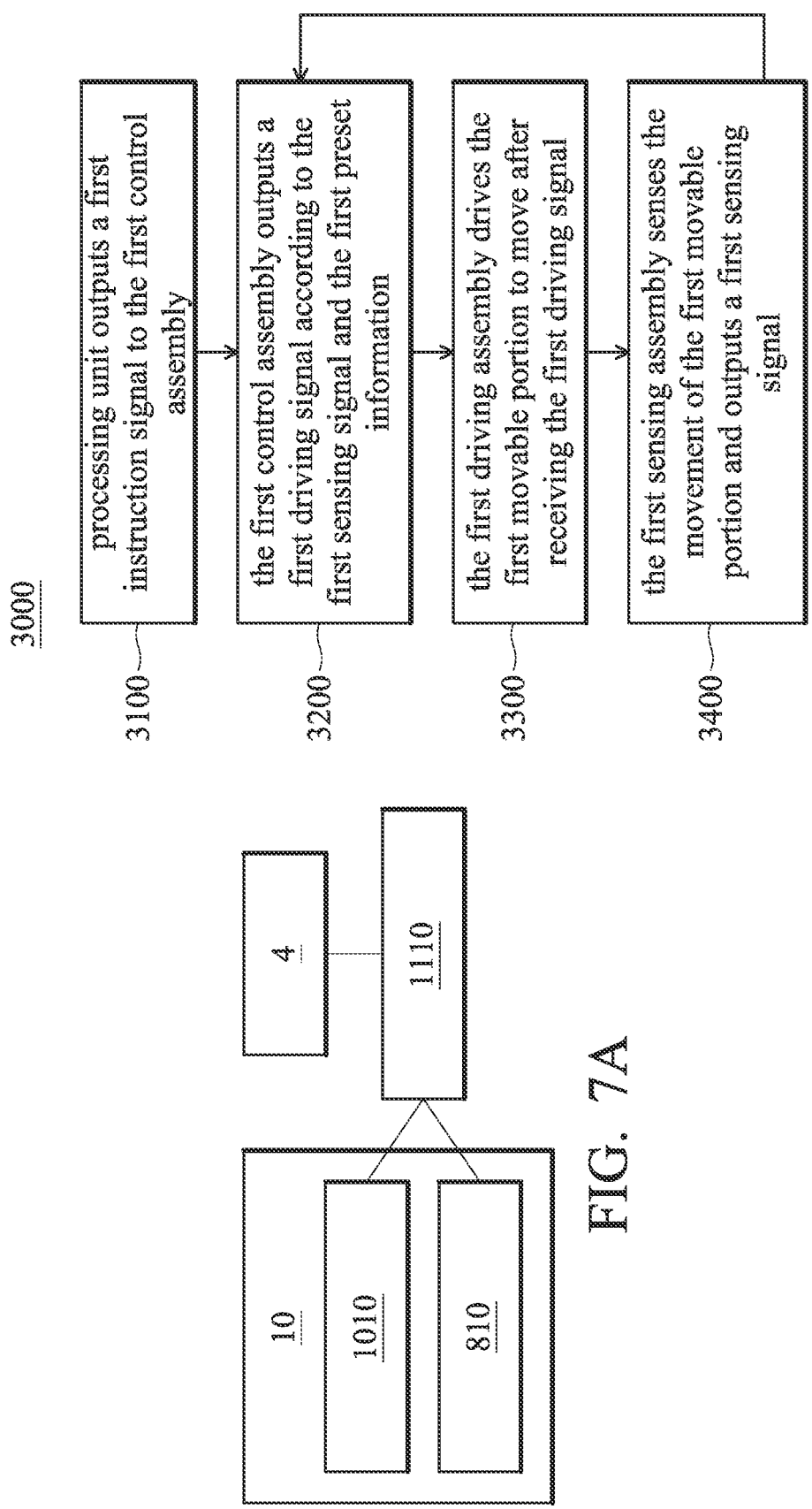
FIG. 7A is a block diagram of a processing unit connected to the first control assembly, according to certain aspects of the present disclosure.
FIG. 7B is a flowchart of closed-loop control of the optical component driving mechanism, according to certain aspects of the present disclosure.

FIG. 7A shows a block diagram of a processing unit 4 connected to the first control assembly 1110. FIG. 7B shows a flowchart 3000 of closed-loop control of the optical component driving mechanism 10. As shown in FIG. 7A, the processing unit 4 is connected to the first control assembly 1110, which is connected to the first driving assembly 810 and the first sensing assembly 1010.

The second control assembly 1120 is connected to the processing unit 4, the second driving assembly 820, and the second sensing assembly 1020 in a manner similar to the first control assembly 1110 connecting to the processing unit 4, the first driving assembly 810, and the first sensing assembly 1010, as shown in FIG. 7A.

As shown in FIG. 7B, step 3100 includes the processing unit 4 outputting a first instruction signal to the first control assembly 1110. Step 3200 includes the first control assembly 1110 outputting a first driving signal according to the first sensing signal and the first preset information. Step 3300 includes the first driving assembly 810 driving the first movable portion 200 to move after receiving the first driving signal.

Step 3400 includes the first sensing assembly 1010 sensing the movement of the first movable portion 200 and outputting a first sensing signal. Then, step 3400 returns to step 3200, and the process will continue. The optical component driving mechanism 10 performs closed-loop control through the system described above.

That is to say, in the flowchart 3000, the first instruction signal is regarded as the target value, the first preset information is regarded as the comparison value, and the first sensing signal senses the current position, to perform closed-loop control.

Similarly, the processing unit 4 outputs the second instruction signal to the second control assembly 1120. Next, the second control assembly 1120 outputs a second driving signal according to the second sensing signal and the second preset information. Then, the second driving assembly 820 drives the second movable portion 300 to move after receiving the second driving signal. Then, the second sensing assembly 1020 senses the movement of the second movable portion 300 and outputs a second sensing signal. This process will continue to implement closed-loop control.

Figure 8:
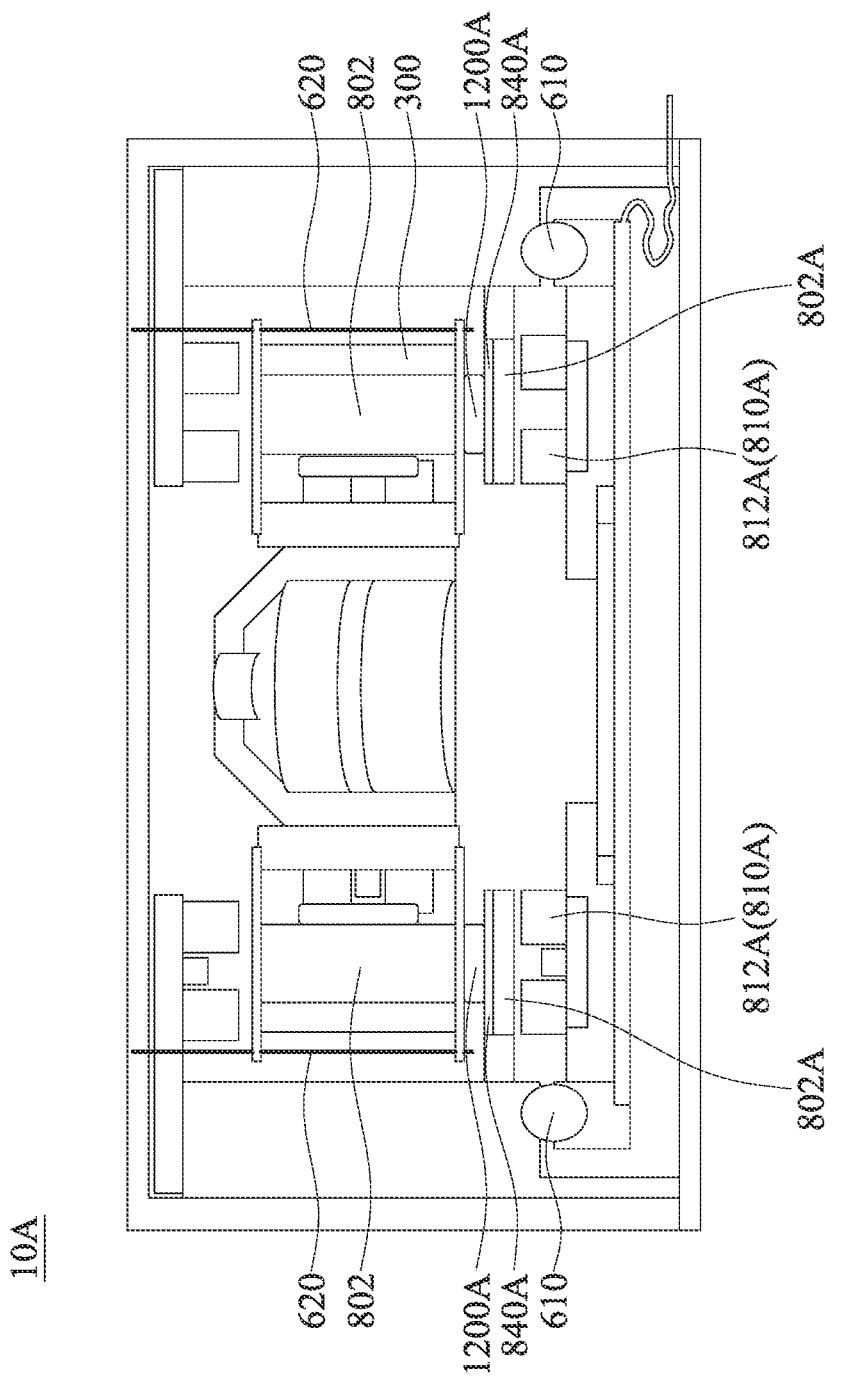
FIG. 8 is a cross-sectional view of a modification of an optical component driving mechanism, according to certain aspects of the present disclosure.

FIG. 8 shows a cross-sectional view of the optical component driving mechanism 10A of another embodiment. The difference between the optical component driving mechanism 10A shown in FIG. 8 and the optical component driving mechanism 10 shown in FIG. 3 is that, the embodiment shown in FIG. 8 further includes a set of magnetic components 802A, a set of magnetically permeable components 840A, and a buffer component 1200A. The magnetic components 802A and the magnetically permeable components 840A correspond to the first coils 812A. The buffer component 1200A is disposed between the second movable portion 300 and the magnetically permeable component 840A. With the configuration of the magnetic components 802A and the magnetically permeable components 840A, the first driving assembly 810A has a stronger driving force than the first driving assembly 810 does.

Figure 9:
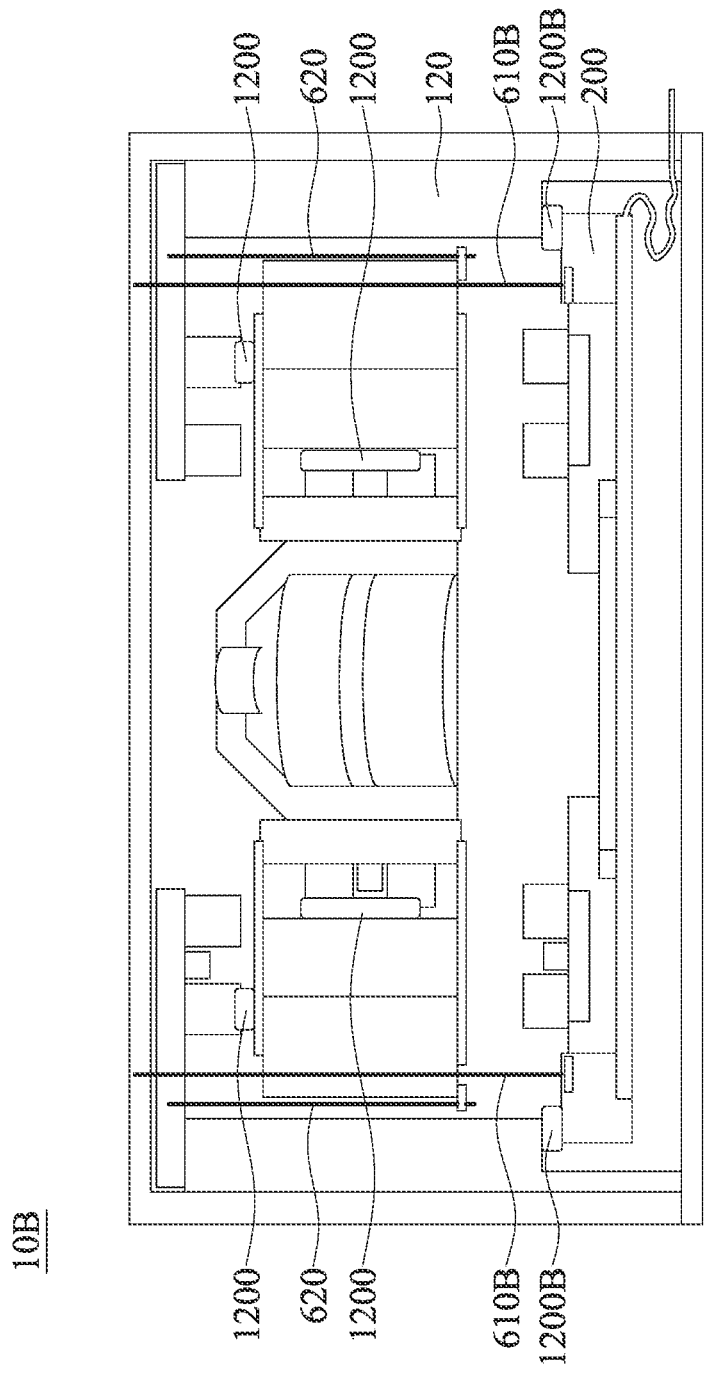
FIG. 9 is a cross-sectional view of another modification of an optical component driving mechanism, according to certain aspects of the present disclosure.

FIG. 9 shows a cross-sectional view of the optical component driving mechanism 10B of another embodiment. The difference between the optical component driving mechanism 10B shown in FIG. 9 and the optical component driving mechanism 10 shown in FIG. 3 is that, the embodiment shown in FIG. 9 further includes a buffer component 1200B disposed between the frame 120 and the first movable portion 200.

Furthermore, the first support assembly 610B in the present embodiment is a set of suspension wires. It should be noted that although the first support assembly 610B and the second support assembly 620 are both suspension wires, the first support assembly 610B and the second support assembly 620 have different lengths.

Figure 10:
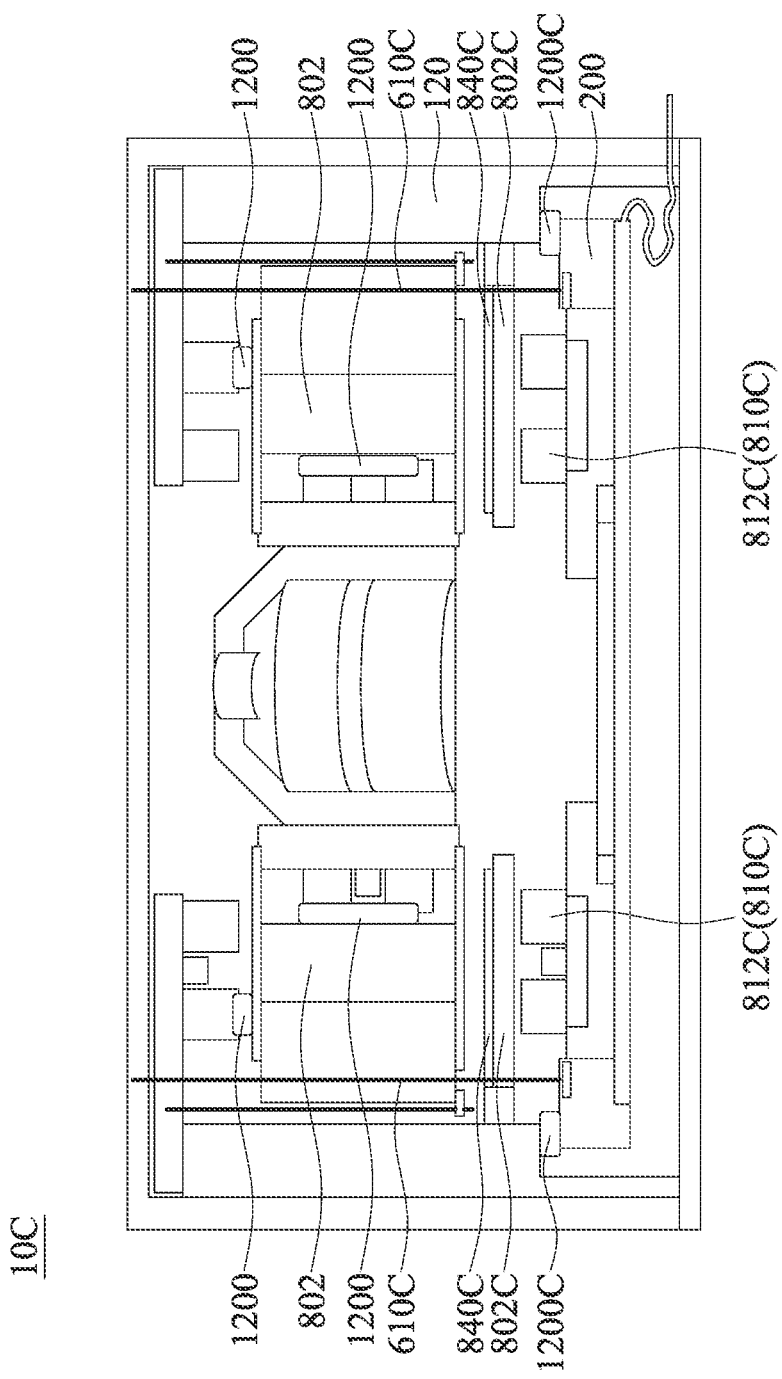
FIG. 10 is a cross-sectional view of another modification of an optical component driving mechanism, according to certain aspects of the present disclosure.

FIG. 10 shows a cross-sectional view of the optical component driving mechanism 10C of another embodiment. The difference between the optical component driving mechanism 10C shown in FIG. 10 and the optical component driving mechanism 10B shown in FIG. 9 is that, the embodiment shown in FIG. 10 further includes a set of magnetic components 802C, a set of magnetically permeable components 840C, and a buffer component 1200C. The magnetic components 802C and the magnetically permeable components 840C correspond to the first coils 812C. The buffer component 1200C is disposed between the frame 120 and the first movable portion 200. With the configuration of the magnetic components 802C and the magnetically permeable components 840C, the first driving assembly 810C has a stronger driving force than the first driving assembly 810B does.

Figure 11:
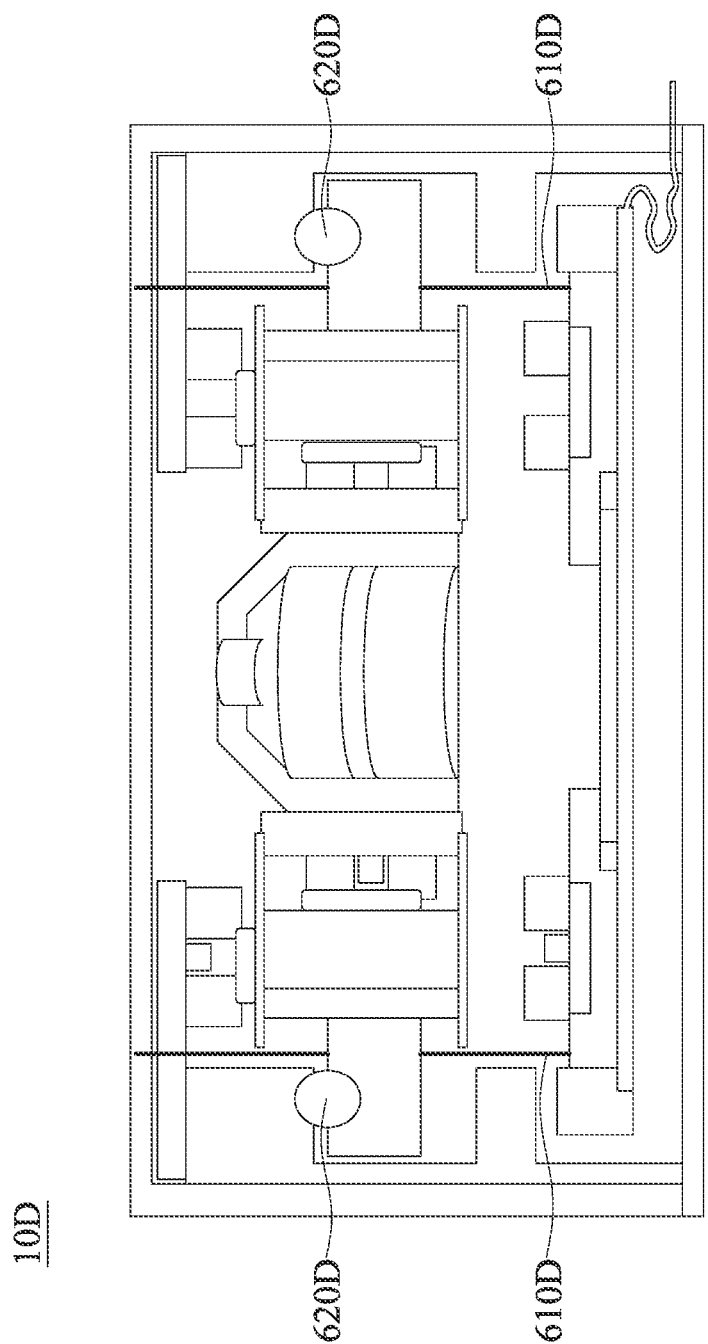
FIG. 11 is a cross-sectional view of another modification of an optical component driving mechanism, according to certain aspects of the present disclosure.

FIG. 11 shows a cross-sectional view of the optical component driving mechanism 10D of another embodiment. The difference between the optical component driving mechanism 10D shown in FIG. 11 and the optical component driving mechanism 10 shown in FIG. 3 is that, the first support assembly 610D of the present embodiment shown in FIG. 11 is a set of suspension wires, and the second support assembly 620D is a set of balls.

Figure 12:
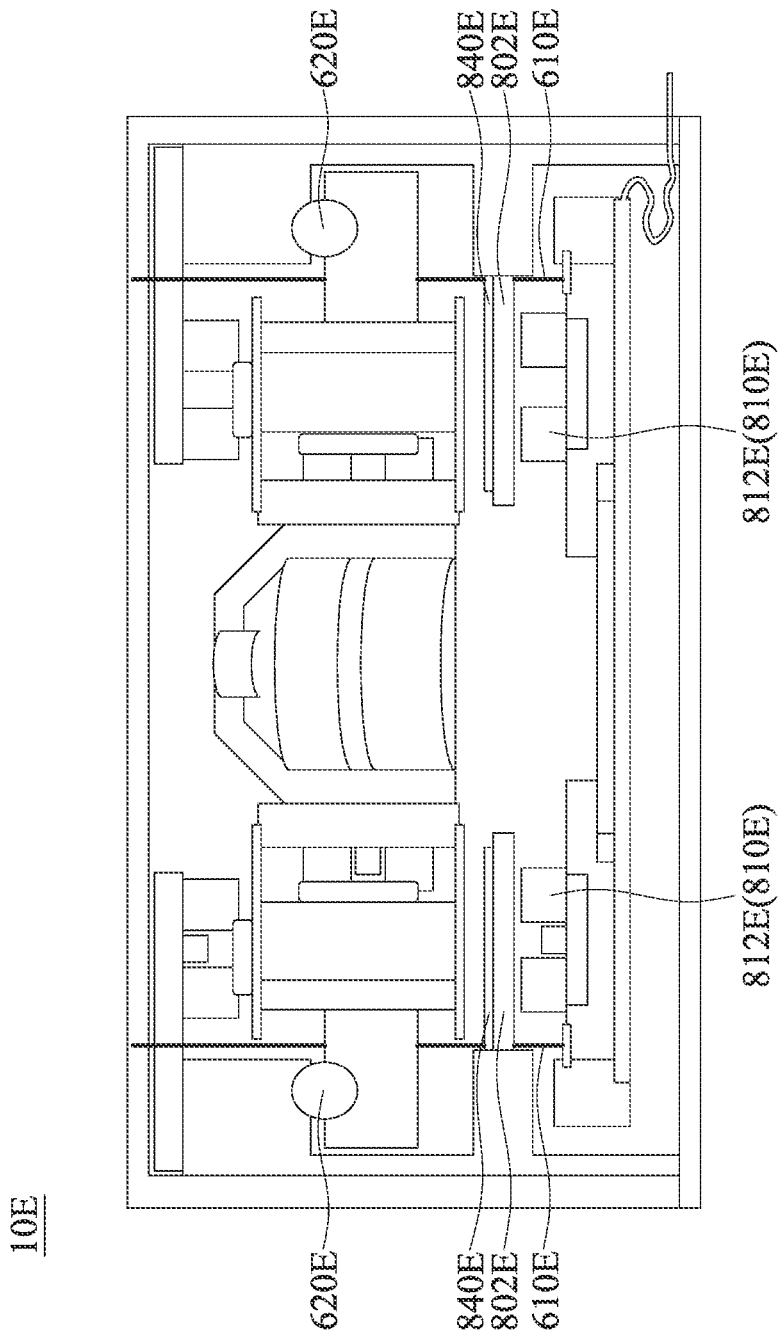
FIG. 12 is a cross-sectional view of another modification of an optical component driving mechanism, according to certain aspects of the present disclosure.

FIG. 12 shows a cross-sectional view of the optical component driving mechanism 10E of another embodiment. The difference between the optical component driving mechanism 10E and the optical component driving mechanism 10D in FIG. 11 is that, the embodiment shown in FIG. 12 further includes a set of magnetic components 802E and a set of magnetically permeable components 840E. The magnetic components 802E and the magnetically permeable components 840E correspond to the first coils 812E. With the configuration of the magnetic components 802E and the magnetically permeable components 840E, the first driving assembly 810E has a stronger driving force than the first driving assembly 810 D does.

Figure 13:
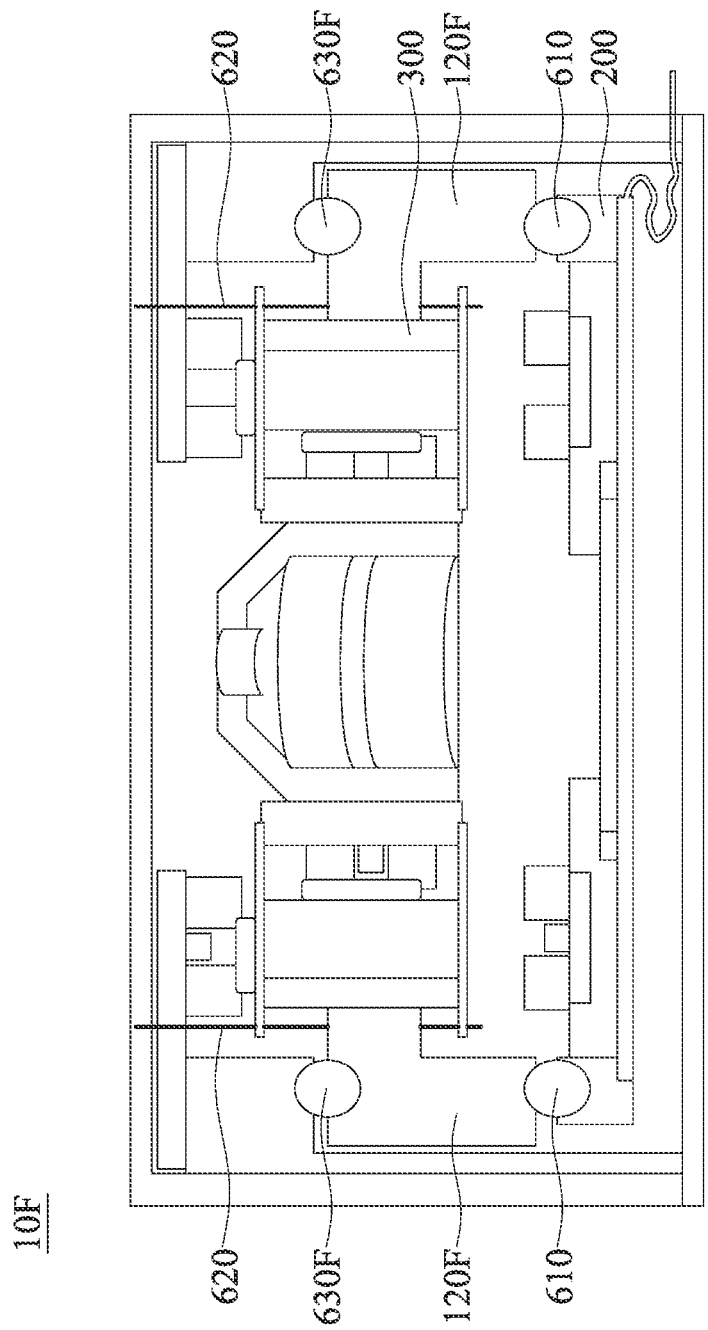
FIG. 13 is a cross-sectional view of another modification of an optical component driving mechanism, according to certain aspects of the present disclosure.

FIG. 13 shows a cross-sectional view of the optical component driving mechanism 10F of another embodiment. The difference between the optical component driving mechanism 10F shown in FIG. 13 and the optical component driving mechanism 10 shown in FIG. 3 is that, the embodiment shown in FIG. 13 further includes an inner frame 120F and a third support assembly 630F. The inner frame 120F contacts the first support assembly 610, the second support assembly 620, and the third support assembly 630F. In the present embodiment, the third support component 630F is a set of balls. The configuration of the inner frame 120F and the third support assembly 630F may assist the first movable portion 200 to move relative to the second movable portion 300.

In summary, the present invention provides an optical component driving mechanism for driving the first optical component and the second optical component, thereby achieving functions such as optical focusing or optical image stabilization. The first movable portion and the second movable portion are driven in opposite directions, so that the optical component driving mechanism may reach a larger optical image stabilization angle or a wider range of focusing with a smaller size. Therefore, the optical component driving mechanism have better optical focusing and optical compensation capabilities, which greatly improving the performance of electronic devices.

The ordinal numbers in this specification and the claim, such as "first", "second", etc., do not have a sequential relationship between each other, and they are only used to distinguish two different components with the same name.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical component driving mechanism, comprising:
a first movable portion connecting a first optical component;
a fixed portion, wherein the first movable portion is movable relative to the fixed portion;
a first driving assembly for driving the first movable portion to move relative to the fixed portion;
a first support assembly, wherein the first movable portion is movable relative to the fixed portion via the first support assembly;
a first sensing assembly sensing the movement of the first movable portion; and
a first control assembly outputting a first driving signal to the first driving assembly;
wherein the first movable portion is movable relative to the fixed portion in a first dimension within a first-limit range; and
wherein the first sensing assembly outputs a first sensing signal, an external apparatus measures and records a first preset information, and the first preset information comprises the first sensing signal corresponding to the position of the first movable portion within a first recording range, and the first recording range is greater than the first-limit range, the first control assembly outputs the first driving signal according to the first sensing signal and the first preset information.

2. The optical component driving mechanism as claimed in claim 1, further comprising:
a first-limit component limiting the range of motion of the first movable portion so as not to exceed the first-limit range.

3. The optical component driving mechanism as claimed in claim 2, further comprising:
a second movable portion connecting a second optical component, wherein the second movable portion is movable relative to the first movable portion; and
a second driving assembly for driving the second movable portion to move relative to the fixed portion;
wherein the second movable portion is movable relative to the fixed portion in a second dimension within a second-limit range, and the first sensing assembly senses the movement of the first movable portion relative to the second movable portion.

4. The optical component driving mechanism as claimed in claim 3, wherein the first sensing component comprises a reference component or a first sensing component, and the reference component or the first sensing component is fixedly disposed on the second movable portion.

5. The optical component driving mechanism as claimed in claim 3, further comprising a second support assembly, wherein the second movable portion is movable relative to the fixed portion via the second support assembly, and the length of the first support assembly is different from the length of the second support assembly.

6. The optical component driving mechanism as claimed in claim 3, further comprising:
a second-limit component limiting the range of motion of the second movable portion so as not to exceed the second-limit range;
a second sensing assembly sensing the movement of the second movable portion; and
a second control assembly outputting a second driving signal to the second driving assembly;
wherein the second sensing assembly outputs a second sensing signal, the external apparatus measures and records a second preset information, and the second preset information comprises the second sensing signal corresponding to the position of the second movable portion within a second recording range, wherein the second recording range is smaller than or equal to the second-limit range, and the second control assembly outputs the second driving signal according to the second sensing signal and the second preset information.

7. The optical component driving mechanism as claimed in claim 6, wherein the first dimension is movement on a first axis, the second dimension is movement on the first axis, the first-limit range is different from the second-limit range, and the first sensing assembly and the second sensing assembly are located on different sides with respect to the second movable portion.

8. The optical component driving mechanism as claimed in claim 7, wherein the first sensing assembly and the second sensing assembly are located on opposite sides with respect to the second movable portion when viewed along any direction perpendicular to a first optical axis.

9. The optical component driving mechanism as claimed in claim 6, wherein after receiving a first instruction signal output by a processing unit, the first control assembly outputs the first driving signal, and after receiving a second instruction signal output by the processing unit, the second control assembly outputs the second driving signal, and the processing unit is located outside the optical component driving mechanism.

10. The optical component driving mechanism as claimed in claim 9, wherein the first control assembly and the second control assembly simultaneously output the first driving signal and the second driving signal to the first driving assembly and the second driving assembly, respectively.

11. The optical component driving mechanism as claimed in claim 3, further comprising a third driving assembly and a third movable portion, the third driving assembly is configured to drive the third movable portion to move relative to the fixed portion in a third dimension, wherein the third dimension is movement in the direction of a second optical axis.

12. The optical component driving mechanism as claimed in claim 11, wherein the first driving assembly comprises a first magnetic component and a first coil, wherein the first coil corresponds to the first magnetic component.

13. The optical component driving mechanism as claimed in claim 12, wherein the second driving assembly comprises a second magnetic component and a second coil, wherein the second coil corresponds to the second magnetic component.

14. The optical component driving mechanism as claimed in claim 13, wherein the first coil and the second coil at least partially overlap when viewed along a first optical axis.

15. The optical component driving mechanism as claimed in claim 14, wherein the third driving assembly comprises a third magnetic component and a third coil, wherein the third coil corresponds to the third magnetic component.

16. The optical component driving mechanism as claimed in claim 15, further comprising a magnetically permeable component and a first circuit assembly, wherein the magnetically permeable component has a magnetically permeable material, and the magnetically permeable component is embedded in the first circuit assembly.

17. The optical component driving mechanism as claimed in claim 16, wherein the magnetically permeable component overlaps the first coil when viewed along the first optical axis.

18. The optical component driving mechanism as claimed in claim 15, wherein the fixed portion comprises a frame, the frame accommodates the first movable portion and the second movable portion, and the first movable portion at least partially overlaps the frame when viewed along the first optical axis.

19. The optical component driving mechanism as claimed in claim 18, further comprising a plurality of buffer components, wherein the buffer components are disposed between the first movable portion and the frame, on the second coil, and on the third coil.

20. The optical component driving mechanism as claimed in claim 18, further comprising a second circuit assembly, wherein the second coil is fixedly disposed on the second circuit assembly, the fixed portion further comprises a housing, fixedly connected to the frame, and the second circuit assembly is disposed between the housing and the frame when viewed along a direction perpendicular to the first optical axis.

* * * * *